(12) United States Patent
Godwin (10) Patent No.: US 12,153,562 B2
(45) Date of Patent: Nov. 26, 2024

(54) SYSTEM AND METHOD FOR IMPROVING DATA VALIDATION AND SYNCHRONIZATION ACROSS DISPARATE PARTIES

(71) Applicant: FleetNet America IP Holdings, LLC, Fort Smith, AR (US)

(72) Inventor: Jeffrey Godwin, Fort Smith, AR (US)

(73) Assignee: FleetNet America IP Holdings, LLC

( * ) Notice: Subject to any disclaimer, the term of this patent is extended or adjusted under 35 U.S.C. 154(b) by 0 days.

(21) Appl. No.: 18/093,503

(22) Filed: Jan. 5, 2023

(65) Prior Publication Data

US 2023/0161750 A1 May 25, 2023

Related U.S. Application Data

(63) Continuation of application No. 17/388,685, filed on Jul. 29, 2021, now abandoned.

(60) Provisional application No. 63/060,879, filed on Aug. 4, 2020.

(51) Int. Cl.
*G06F 16/00* (2019.01)
*G06F 16/23* (2019.01)
*G06F 16/27* (2019.01)
*G06F 21/62* (2013.01)

(52) U.S. Cl.
CPC .......... *G06F 16/2358* (2019.01); *G06F 16/27* (2019.01); *G06F 21/6272* (2013.01)

(58) Field of Classification Search
CPC ... G06F 16/2358; G06F 16/27; G06F 21/6272
See application file for complete search history.

(56) References Cited

U.S. PATENT DOCUMENTS

| 10,885,134 | B2* | 1/2021 | McGrath | G16H 10/60 |
|---|---|---|---|---|
| 10,909,266 | B2* | 2/2021 | Hurry | G06F 21/44 |
| 11,328,255 | B2* | 5/2022 | Randles | G06Q 10/103 |
| 2009/0089310 | A1* | 4/2009 | Lara | G06F 16/972 |
| | | | | 707/999.102 |

(Continued)

*Primary Examiner* — Alexander Khong
(74) *Attorney, Agent, or Firm* — Eversheds Sutherland (US) LLP (57) ABSTRACT

Systems and methods allow for a variety of partners to store information in a database utilizing connected services to securely allow retrieval of such data by the partners. A collection of data points that make up a record allows for positive record matching. Individual data elements are generally stored for each partner connected to the record. Partners can only store data elements associated with a unique, known record. Numerous partners may contribute their data in the form of record components and each retains access rights to their own private data which is not shared within the platform. This allows for different data about the same record and data point to be stored by each party (partner). Partners can retrieve their own values should the need arise and also have access to the sureEcosystem Value for fields where the partner has contributed qualifying data. The sureEcosystem Value comes from an algorithm utilizing value frequency, submission dates, partner rankings, record owner input and other validation components in its analysis of contributed information to determine the value most likely accurate at any given time.

17 Claims, 6 Drawing Sheets

(56) References Cited

U.S. PATENT DOCUMENTS

| | | | |
|---|---|---|---|
| 2011/0010340 A1* | 1/2011 | Hung | H04L 51/046 709/204 |
| 2016/0085789 A1* | 3/2016 | Fuchs | G06F 16/215 707/691 |
| 2016/0094657 A1* | 3/2016 | Vieira | H04L 67/1097 709/217 |
| 2021/0271662 A1* | 9/2021 | Muse | G16H 50/70 |

* cited by examiner

SYSTEM AND METHOD FOR IMPROVING DATA VALIDATION AND SYNCHRONIZATION ACROSS DISPARATE PARTIES

CROSS-REFERENCE TO RELATED APPLICATIONS

This application is a continuation of U.S. patent application Ser. No. 17/388,685, filed Jul. 29, 2021, which claims priority to U.S. Provisional Application Ser. No. 63/060,879, filed Aug. 4, 2020, the entire contents of which are hereby incorporated by reference in their entirety.

FIELD OF THE INVENTION

The invention relates to the field of data and database management. More specifically, the present invention discloses systems and methods for securely storing data elements about individual records on behalf of multiple parties, validating updated entries where possible, and sharing element level calculated most likely accurate values back to those who contribute to the same elements.

BACKGROUND

Database management systems allow users to store data securely as well as to modify and/or retrieve their stored data. In cases where multiple, disparate parties utilize a common database, the data of these parties is separated for data integrity and security. There is value, however, in connecting and analyzing the various data being stored by these parties. In many cases, one party may get an update on a specific record or data element before other parties are aware of the update. Rather than having to partner with outside companies to share data, it is desired that parties should be able to connect their database to a third-party service who securely stores the data of each party while programmatically adding value through analysis of the various contributed data and sharing of guidance based on its findings rather than directly sharing data submitted by each party.

SUMMARY

The system of the present invention allows parties to submit their records, and the elements making up those records, to a centralized data repository to which they have access and can submit, store, query, retrieve, update, overwrite, or delete their own values for any element at any time using web services or other connection methods. Users of the system are likely to engage through common communication channels including, but not limited to, cell phones, personal computers, tablets, etc. Records are aligned within the system and allow comparison of data elements submitted by various users. The party provides authorization or refusal to contribute their data to the system of the present invention for further analysis.

Data elements not specifically flagged as contributed are stored on behalf of the submitting party and are not analyzed or shared with other parties. Submissions of new or updated data from users for a contributed element cause an analysis of recent validation and subsequently starts a validation process where possible or necessary. Simultaneously, these data submissions begin an algorithmic calculation to determine the value most likely to be accurate at any time for the contributed element. The calculated data is shared with the contributing party with the option for them to retrieve the calculated value and/or their own stored value.

DETAILED DESCRIPTION

Figure 1:
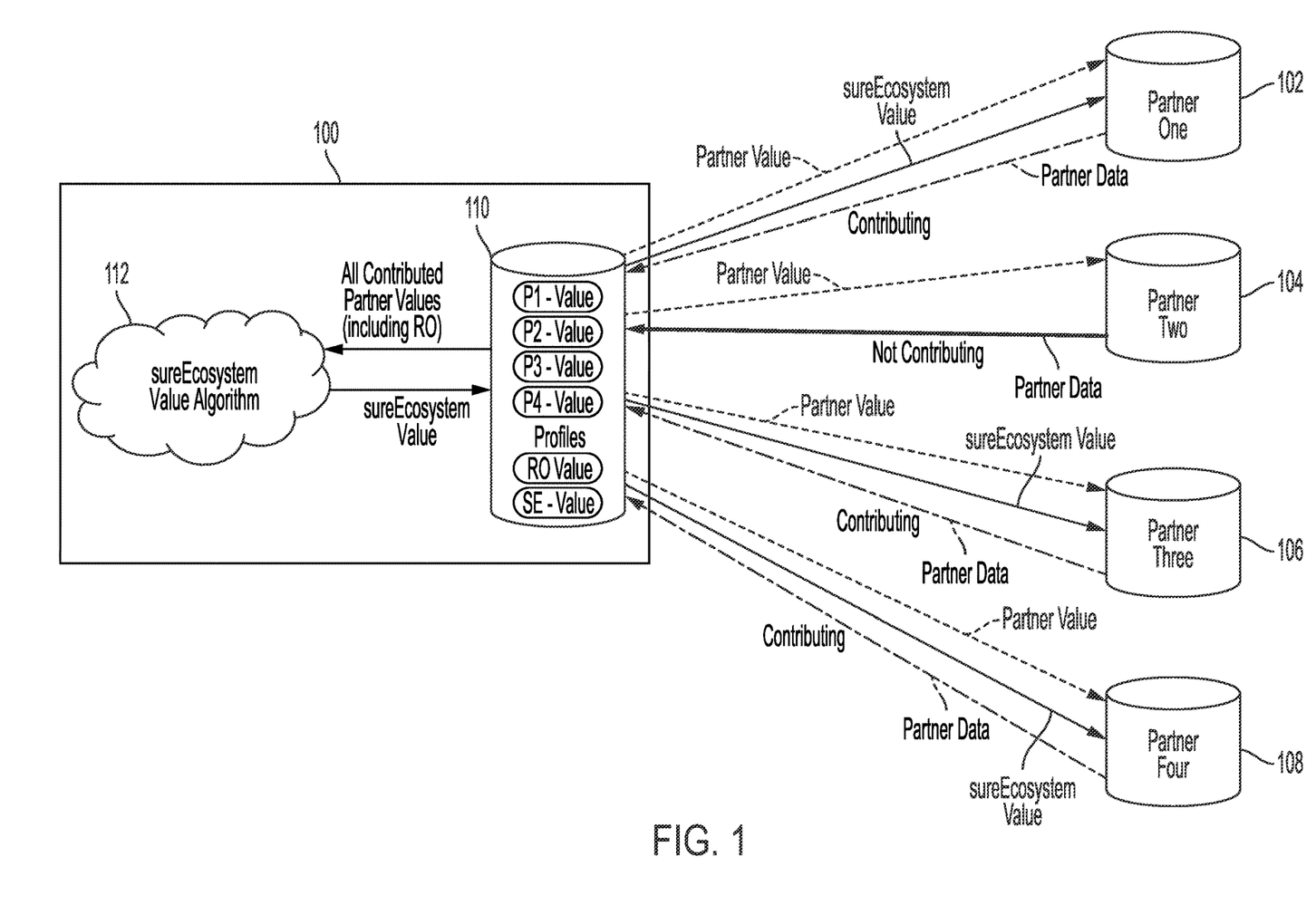
FIG. 1 depicts the data flow between a plurality of connected partners and the sureEcosystem (SE) database.

FIG. 1 depicts that data flow between connected partners 102-108 and SE database 110. Partners 102, 106, and 108 are contributing partners whereas partner 104 is a non-contributing partner. Specifically, partner 104 utilizes SE 100 like a traditional cloud storage and retrieval system wherein data can be stored and retrieved from SE database 110, but partner 104 has not enabled use of this information by SE 100 for SE value algorithm 112.

In contrast, partners 102, 106, and 108 enabled their stored data to be shared with SE value algorithm 112. By allowing access to their stored data for analysis, partners 102, 106, and 108 are provided with the ability to retrieve the SE value or the stored value. Each partner 102, 106, and 108 can decide the amount and level of data shared with SE value algorithm 112. For example, partner 102 may allow SE value algorithm 112 access to all stored data whereas partner 106 may only allow access to certain stored fields, while restricting access to other fields. The permissions to the stored data granted by each partner 102-108 is stored in SE database 110. The permissions to the stored data can also be updated at any time. For example, partner 102 can elect to become a contributing partner at a first date and later revoke that permission at a second later date.

Every time new shared data is contributed by partners 102, 106, and 108, SE value algorithm 112 analyzes the new contributions and updates the SE value if necessary. This provides the partners 102, 106, and 108 access to the most recent sureEcosystem values, resulting in the constant availability of a specific data point's most likely current value.

SE database 110 further stores the data contributed to SE 100 by each contributing or non-contributing partner in association with the partner profile. As changes are made to the data stored for each partner 102-108, a record is kept of the value for each stored field of data for record keeping purposes. This historical data is utilized by SE value algorithm 112 to calculate the SE value for each field of data as will be described later.

Once data has been collected from at least one partner, SE value algorithm 112 calculates an initial SE value for each field possible. Then, as updated data is received over time, the SE value is reevaluated and shared with partners 102, 106, and 108.

The arrows from SE database 110 to partners 102-108 represent the ability to retrieve the partner's own data RO value (dashed black line) or the current SE value. Partner 104, as a non-contributing partner, does not have the ability to retrieve the SE value.

Figure 2:
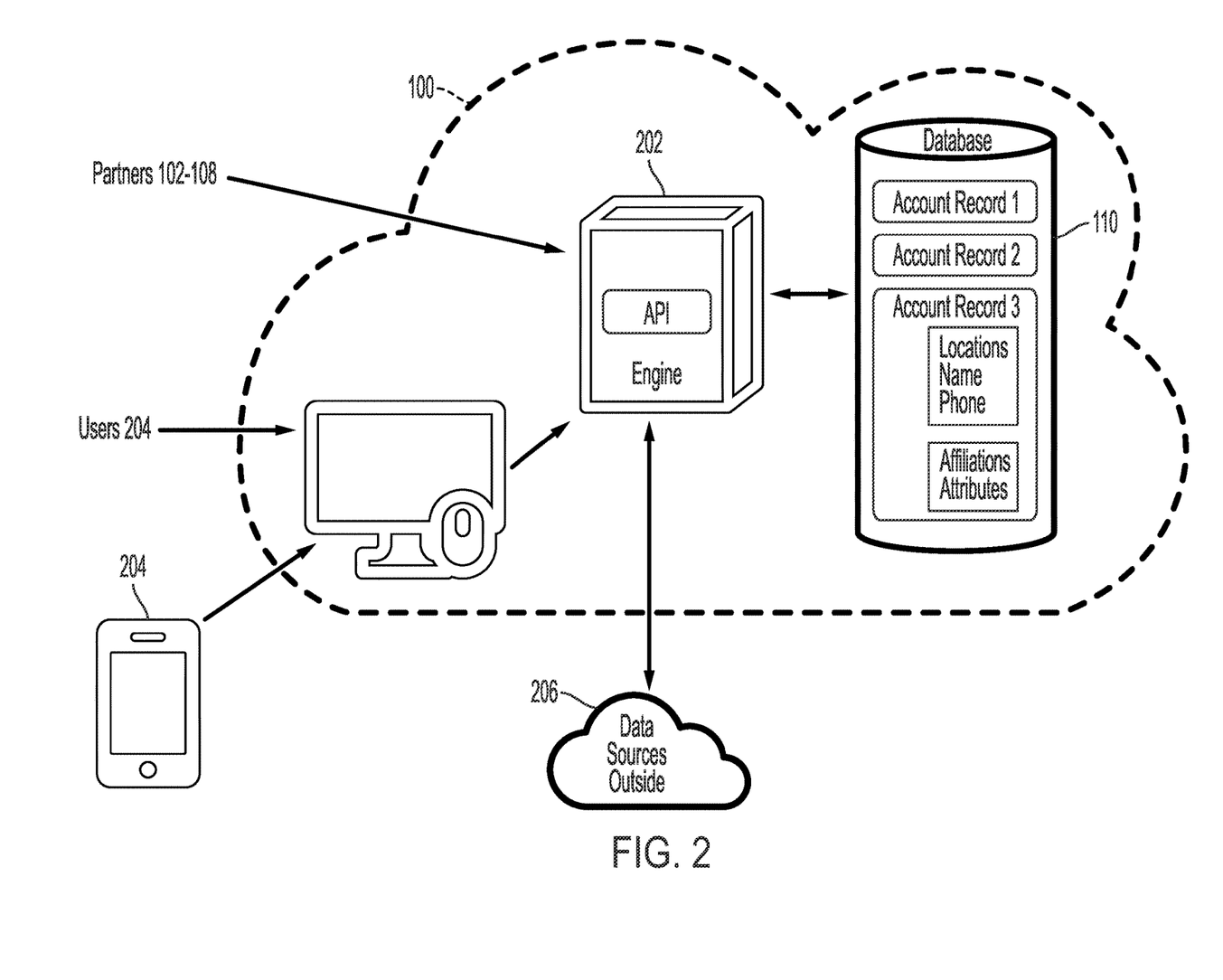
FIG. 2 depicts how partners access SE.

FIG. 2 depicts how various connections can be made to SE 100 via SE application programming interface (API) engine 202. API engine 202 allows the partners 102-108 to access SE database 110. In a preferred embodiment, even local users 204 of SE 100 utilize API engine 202 when accessing SE database 110. This structure allows partners and outside sources 206 the ability to access SE database 110 while maintaining no direct access to SE database 110, providing an extra level of security.

Figure 3A:
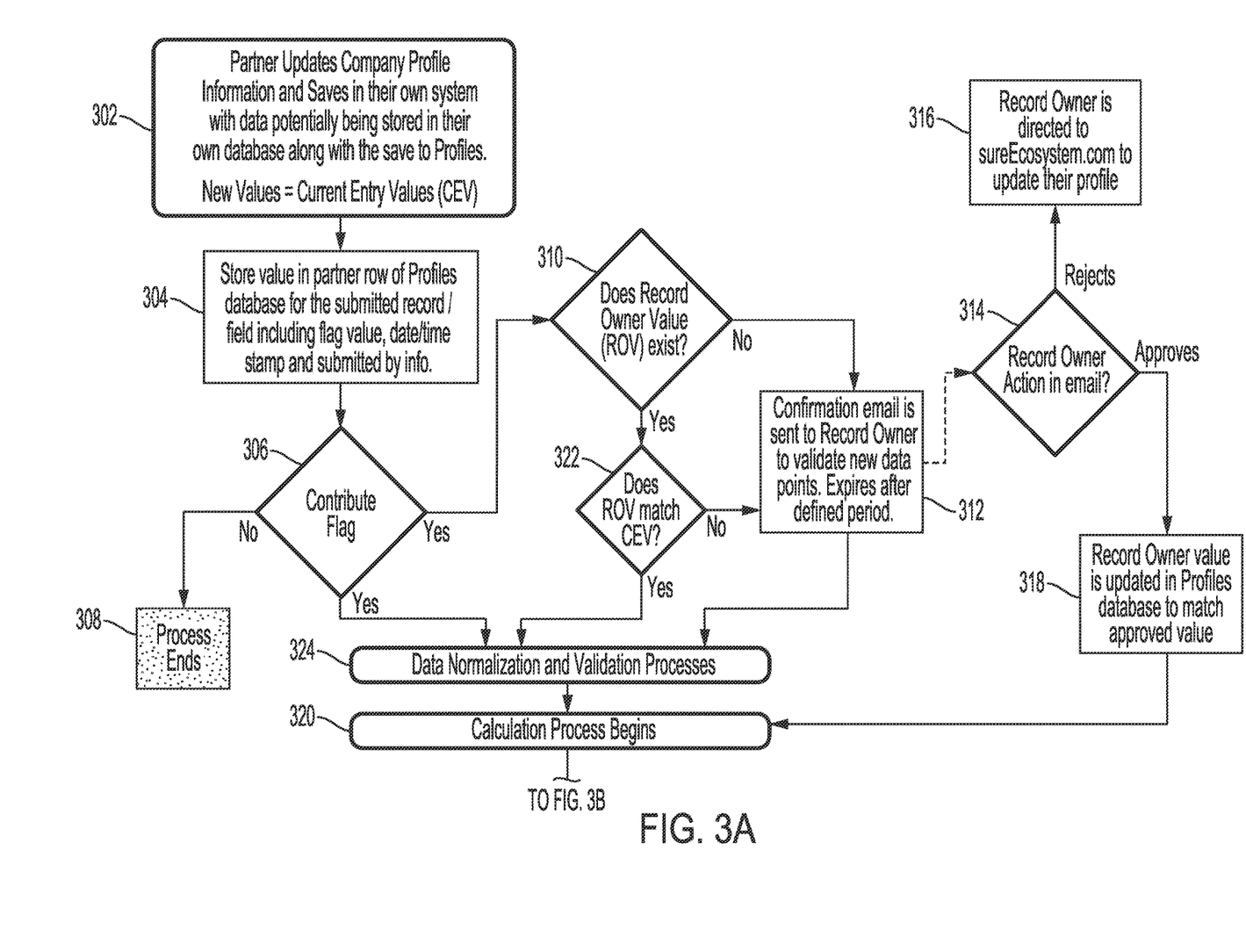
FIGS. 3A-3C depicts a flowchart showing how data from connected parties is analyzed and/or stored by SE.
Figure 3B:
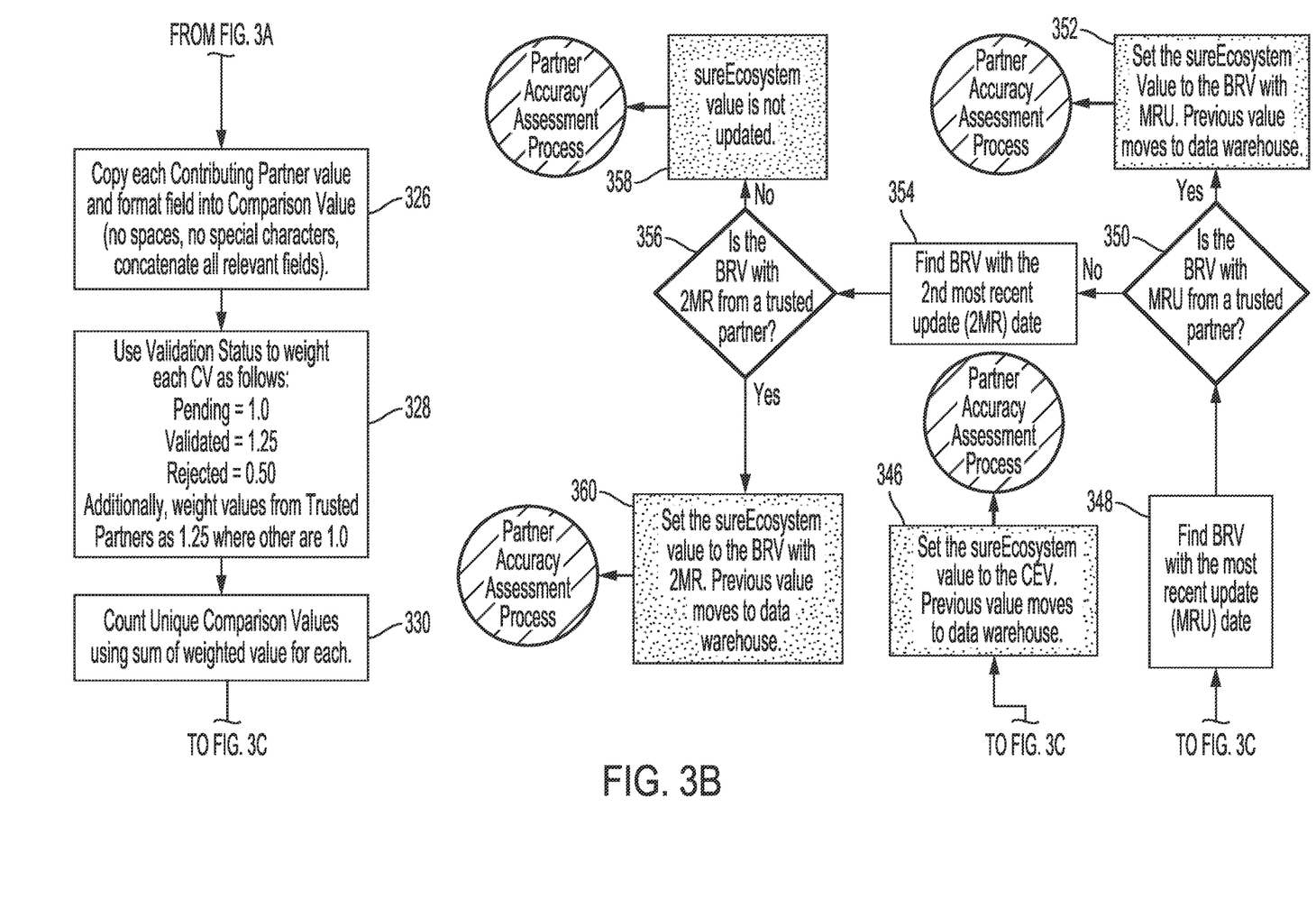
Figure 3C:
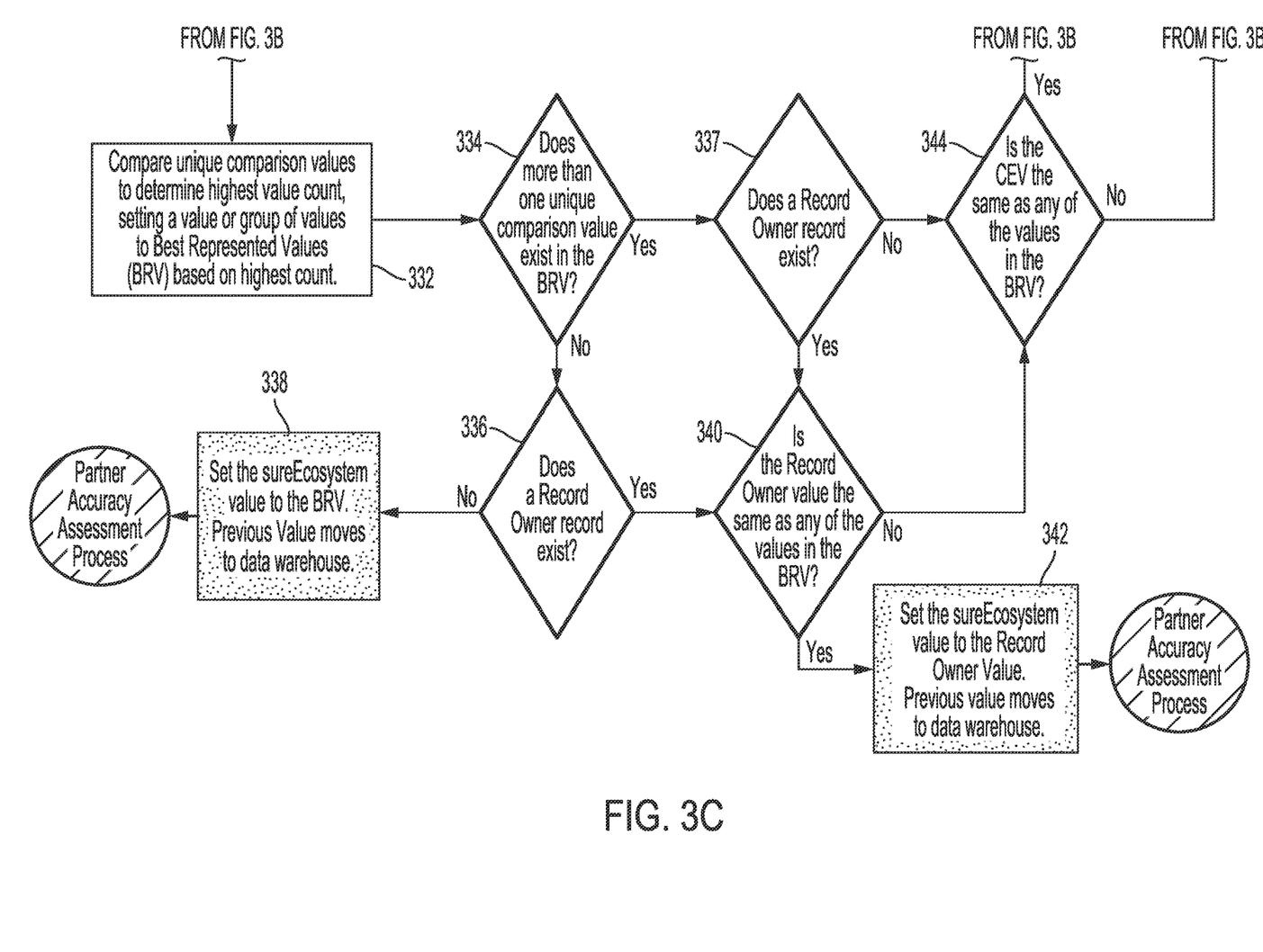

FIGS. 3A-3C depict flowcharts which describe the process by which the SE value is calculated for each transaction where the SE database 110 is updated for any element of a record. The example described herein is a partner updating fields in a vendor or contact database. However, it should be apparent to one of ordinary skill in the art that the described calculation of the SE value can be applied to any database system having multiple contributors having the ability to update records.

Referring first to FIG. 3A, the process flow begins at step 302 with a save event in an external, connected system or with a Record Owner (RO) responding to a verification message which, in turn, causes a database update. The new values received are referred to herein as current entry values (CEV). The CEV are then stored locally in the partner's database as well as being transmitted and stored in association with the partner in SE database 110 in step 304. For each CEV, the field identifier (including a flag value) as well as a timestamp is recorded.

At decision step 306, it is determined if the specific field is a contributing field or a non-contributing field. As previously discussed, each contributing partner 102, 106, and 108 can decide on a field-by-field basis which field types of each record are contributed or not contributed. For partner 104, all of the field types would be marked as not contributed. If a CEV is determined to be not contributed, the SE database is updated and the process is terminated at step 308. If the CEV is determined to be an entry in a contributed field type, it is next determined if a record owner value (ROV) already exists in that field at step 310. If there is no current entry for the CEV, a confirmation (email, alert, etc.) is sent to the RO to validate the CEV at step 312. A confirmation may be sent to the record owner for each CEV or they may be grouped into a single alert and sent periodically (e.g., once a day, after 100 CEVs, etc.). In a preferred embodiment, the CEV must be verified within a set period of time, after which the alert is deleted.

At decision step 314, the RO approves or rejects each CEV. If the CEV is rejected in step 316, the RO is directed to initiate contact with SE 100 to update their profile. If the CEV is approved in step 318, the ROV is updated with the CEV to match the approved value. The CEV is then used to execute SE value algorithm 112 in step 320.

Returning to decision step 310, if the ROV value already exists for the CEV, it is determined in decision step 322 if the current REV matches the CEV. If no, the process proceeds to step 312 already described. If the current REV matches the CEV, a data validation process begins in step 324 (e.g., spell check, etc.) Formatting can be modified by the system here to meet the requirements of data normalization for each specific field. Examples of this normalization include formatting such as a phone number entry being 10 digits without punctuation, converting all email addresses to lower case only and ensuring they meet email structure requirements (i.e.: contain an '@' and a period at some point at least two characters after the '@' plus some combination or at least two characters after the period where the characters after the period are part of a master top level domain (TLD) list maintained within sureEcosystem.), converting web addresses (URLs) to a single standard layout without the use of www, and location addresses where adjustments are made to ensure compliance with USPS guidelines for United States addresses. After data validation, SE value algorithm 112 is executed in step 320 for the CEV.

FIGS. 3B-3C depicts the steps used to calculate/recalculate the SE value based on new or updated CEV values received. First, all ROVs and CEVs, either accepted or rejected, are collected for comparison in step 326. The timestamp associated with each ROV and/or CEV can be used to limit the amount of CEVs or ROVs that are collected. For example, ROVs may be limited to six months whereas rejected CEVs may be limited to two weeks. To ensure a fast and accurate comparison, the ROVs are preferably normalized so that special characters and spaces are removed.

The validation status of each CEV is then used to weight the gathered CEVs in step 328. In a preferred embodiment, pending CEVs are assigned a weight of 1, validated CEVs are assigned a weight of 1.25, and rejected CEVs are assigned a weight of 0.5. In some embodiments, certain partners may be considered "trusted partners" by SE 100. The trusted status can be acquired in a number of ways. For example, if the SE value is the same as the RO value for a partner above a certain threshold percent, that partner may become a trusted partner. In the same way, partners can be demoted from being a trusted partner if their CEVs become unreliable. In a preferred embodiment, Trusted Partner values receive an additional weight of a 1.25 multiple against each status weight.

It should be obvious to one of ordinary skill in the art that the weights for validated CEVs, rejected CEVs, and trusted partners can be automatically calculated by SE value algorithm 112 or set manually by a system administrator when specific, static values are required. Preferably the weight for validated CEVs is >1, the weight for rejected CEVs is <1, and the weight for trusted partners is >1. These values may also be adjusted globally or on a partner-by partner basis if desired.

In step 330, the normalized values are assigned weights and their weighted value is summed to determine a comparison value for each normalized CEV. The comparison values are then compared to determine the best represented values (BRVs) which are comparison values above a predefined threshold.

In decision step 334, it is determined if more than one unique comparison value exists in the BRV. If only a single BRV exists, it is then determined if a ROV already exists in step 336. If no ROV exists, the BRV is set to be the new SE value and the previous SE value is stored in step 338 for backup and posterity.

If there is more than one BRV as determined in step 334, it is next determined if a ROV exists in step 337. If the record owner does exist, the process proceeds to decision step 340. Similarly, if it is determined that a ROV exists in step 336, the process proceeds to decision step 340. In step 340, it is determined if the ROV is the same as any of the values in the BRV. If the ROV is the same as a BRV, the SE value is set to be the ROV and the previous SE value is stored in step 342.

If the ROV is not the same as any of the BRV, the process proceeds to decision step 344. Decision step 344 is also executed if it is determined that no ROV exists in step 337. In step 344, it is determined if the CEV (received in step 302) is the same as any of the BRV. If yes, the CEV is set to be the SE value in step 346 and the previous SE value is stored.

When partners add values to the system, and sureEcosytem values are calculated along with other necessary activities, the system also evaluates and stores information regarding whether or not the value submitted by the partner is, in fact, equal to the resulting sureEcosystem Value or that the sureEcosystem Value becomes equal to the partner submitted value within a specified period of time or within a specified number of record saves. When the partner reaches a volume threshold related to the amount of submitted data, and when their submissions are commonly the current, resulting, or near future sureEcosystem Value, as evaluated by the system, they are eligible for Trusted Partner status which may be offered, evaluated, and accepted either inside the system as a general notification followed by partner evaluation with resulting acceptance or rejection, or it can be done manually by the system administrator.

If the CEV is not the same as any of the BRV, a search is performed to determine the BRV with the most recent update (MRU) date in step 348. In decision step 350, it is determined if the BRV from step 348 is from a trusted partner. If the BRV from step 348 is from a trusted partner as determined in step 350, it becomes the new SE value and the previous SE value is stored in step 352.

If the BRV from step 348 is not from a trusted partner, a search is then performed for the BRV with the second most recent update (2MR) date in step 354. In decision step 356 it is determined if the 2MR BRV is from a trusted partner. If the 2MR BRV is not from a trusted partner, the SE value is not updated in step 358. If the 2MR BRV is from a trusted partner, the 2MR BRV is set to be the SE value in step 360.

The process described with respect to steps 320-360 occurs every time a new CEV is received from any partner. This allows the SE value to be up to date and reliably accurate for use by contributing partners.

Figure 4:
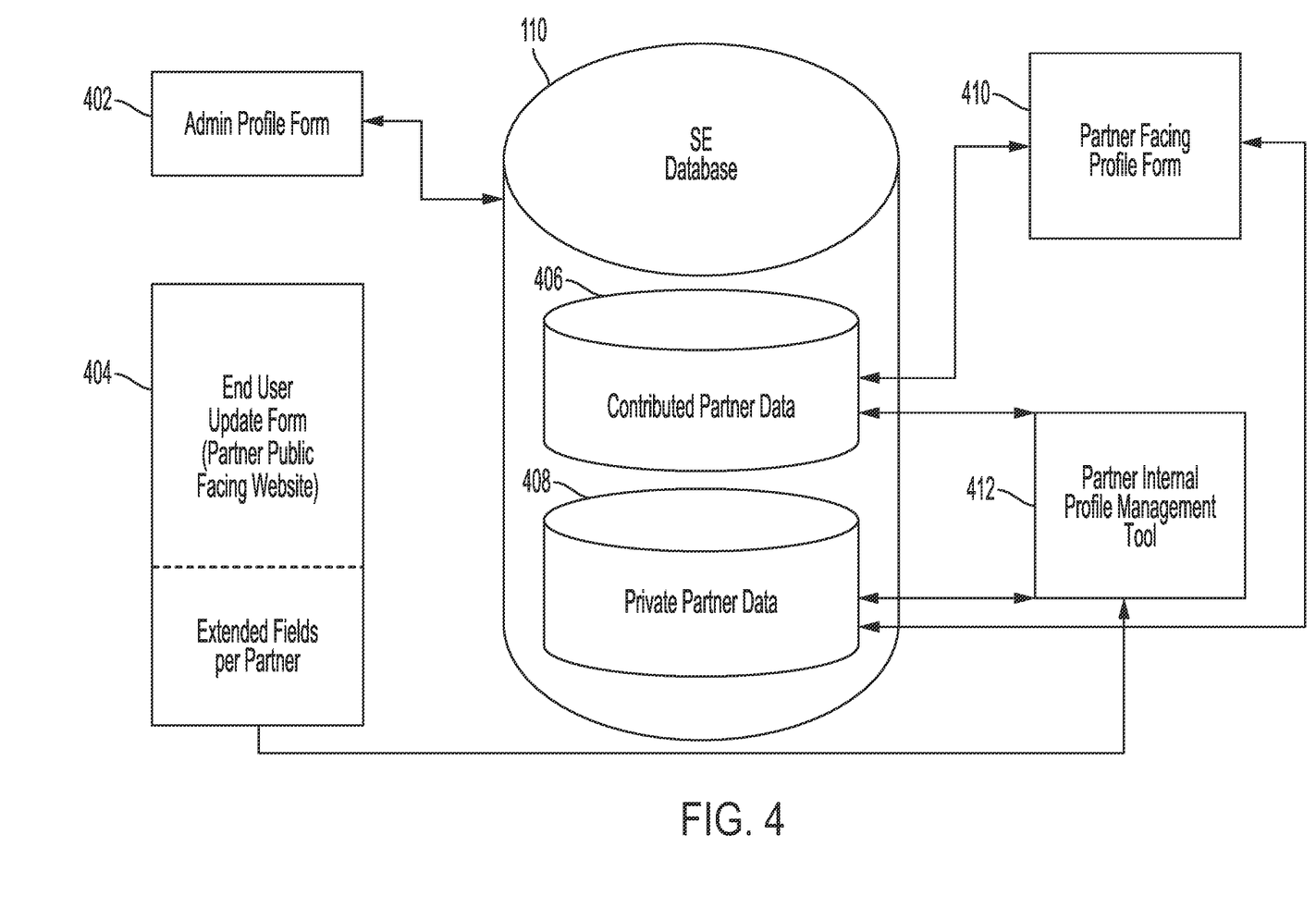
FIG. 4 depicts a sample structure of the SE database and its extensions.

FIG. 4 depicts a sample structure of SE database 110 and its extensions. The left half of the figure depicts how users can interact with SE database 110. An administration tool 402 can be used by administrators to review and set permissions for the various fields and data stored in SE database 110. The tool 404 is an example of a Partner providing a web-based tool for its end user record owners partners 102-108 to update their own data in Partner systems whereby it is also stored in the SE database 110 through that partner system 412. Administration tool 402 interfaces with SE database 110 through API engine 202, providing secure access points. Updates to tool 412 are secured by the Partners and the data throughput to SE 110 also occurs through the secure API engine 202 connection.

The data stored in SE database 110 is preferably assigned a contributed or not contributed flag, such that the stored data can be grouped into contributed data 406 and non-contributed data 408. As previously discussed with respect to FIGS. 1 and 2, partners can only retrieve or view the SE value for fields which they contribute data to.

Similar to public facing tools 402 and 404, partners may also be provided with partner facing tools 410 or have integrated management systems 412 which replicate some abilities of 402 and 404, respectively alongside additional management functions for the Partner. Partner administration tool 410 and partner update tool 412 are not accessible from outside sources other than 404

SE 100 provides the following advantage over other prior art systems:
Reduced cycle time on receiving updates to data pertinent to a record
Leveraging numerous disparate data sources who do not wish to share or connect but can contribute data in return for improved data validation and guidance
Allows partners to determine the potential accuracy level of their data and to receive suggestions of more likely values
The more partners are joined to the system, the more accurate the data can become
Validation by record owner is automated and influences the SE value
Can function as a disaster recovery backup for partner data
Reporting on general data accuracy by the sureEcosystem Profiles tool allows partners visibility into the health of their data as well as information on data age
Analysis of partners data habits can be used to determine partner rankings

The invention claimed is:

1. A method for data synchronization comprising:
receiving a current entry value (CEV) for a field of a shared database from a plurality of fields from a first partner from a plurality of partners;
determine if a record owner value (ROV) for a record owner (RO) exists for the field in the shared database;
comparing the ROV to the CEV to determine a match;
sending a confirmation to the RO if the ROV does not match the CEV;
receiving approval or rejection of the CEV from the RO in response to the confirmation;
weighting the CEV based on the approval or rejection;
determining that a weight of the CEV is greater than a threshold value;
determining that the CEV is a best represented value (BRV) based on the determination that the weight is greater than the threshold value;
determining that the BRV is different than a previous BRV; and
replacing the ROV with the CEV based on determining that the CEV is a BRV.

2. The method according to claim 1, wherein the RO is a partner from the plurality of partners.

3. The method according to claim 1, further comprising:
determining which partners of the plurality of partners are contributing partners for the field; and
only for each partner that is a contributing partner, updating a currently stored value for the field with the CEV after approval of the CEV from the RO.

4. The method according to claim 1, wherein a plurality of CEVs are grouped for approval by the RO.

5. The method according to claim 4, wherein the confirmation expires after a predetermined period of time.

6. A method for data synchronization comprising:
receiving current entry values (CEVs) for a shared field in a shared database from a plurality of contributing partners;
normalizing the CEVs into a plurality of comparison values (CVs);
weighting each CV with a weight determined by a current approval status of each CV,
wherein approved CVs are assigned a first weight, and
wherein rejected CVs are assigned a second weight, wherein the first weight is greater than the second weight;
sum the weighted CVs to determine a best represented value (BRV) from the plurality of CVs;
determining that the BRV is different than a previous BRV; and
updating, based on determining that the BRV is different than the previous BRV, the shared field in the shared database.

7. The method of claim 6, wherein approved CVs from trusted partners from the plurality of contributing partners are additionally assigned a weight value >1.

8. The method of claim 7, wherein the weight value is 1.25.

9. The method of claim 6, wherein a weight for approved CVs is 1.25, and wherein the weight for rejected CVs is 0.5.

10. The method of claim 6, wherein approved CVs are stored for a first time period before being discarded, and wherein rejected CVs are stored for a second time period less than the first time period.

11. The method of claim 10, wherein the first time period is ≥six months.

12. The method of claim 10, wherein the second time period is ≤one month.

13. The method of claim 6, further comprising:
if two weighted CVs have a same sum, selecting the weighted CV from a record owner (RO) as the BRV.

14. The method of claim 6,
if two weighted CVs have a same sum, selecting the weighted CV with a most recent updated as the BRV.

15. The method of claim 6, wherein updating the shared field in the shared database is further based on determining that a contributing flag is set for the CEV.

16. The method of claim 15, further comprising:
receiving a second current entry value (CEV) from a contributing partner of the plurality of contributing partners;
determining that a non-contributing flag is set for the second CEV; and
storing the second CEV in the shared database, wherein the second CEV is inaccessible by any remaining contributing partners of the plurality of contributing partners based on determining that the non-contributing flag is set.

17. The method of claim 16, wherein the shared field is maintained as the BRV based on the non-contributing flag is set for the second CEV.

\* \* \* \* \*